United States Patent
Joe et al.

(10) Patent No.: US 9,769,118 B2
(45) Date of Patent: Sep. 19, 2017

(54) DEVICE FOR PROVIDING SECURITY BARRIER FOR NETWORK

(71) Applicant: Zyxel Communications, Inc., Anaheim, CA (US)

(72) Inventors: Steven H. Joe, Coto de Caza, CA (US); Shawn Rogers, Anaheim, CA (US); Tri Nguyen, Corona, CA (US)

(73) Assignee: Zyxel Communications, Inc., Anaheim, CA (US)

( * ) Notice: Subject to any disclaimer, the term of this patent is extended or adjusted under 35 U.S.C. 154(b) by 100 days.

(21) Appl. No.: 14/875,572

(22) Filed: Oct. 5, 2015

(65) Prior Publication Data

US 2017/0099258 A1    Apr. 6, 2017

(51) Int. Cl.
    *H04L 29/06*    (2006.01)
    *H04L 12/26*    (2006.01)

(52) U.S. Cl.
    CPC ........ *H04L 63/0236* (2013.01); *H04L 43/028* (2013.01); *H04L 63/1425* (2013.01); *H04L 63/20* (2013.01)

(58) Field of Classification Search
    CPC ..................................................... H04L 29/06
    See application file for complete search history.

(56) References Cited

U.S. PATENT DOCUMENTS

| | | | | |
|---|---|---|---|---|
| 7,796,583 B1* | 9/2010 | Enderby | ............ | H04L 12/2898 370/353 |
| 7,920,478 B2* | 4/2011 | Mistry | ............... | H04L 41/5019 370/230 |
| 8,656,497 B2* | 2/2014 | Amarasinghe | .......... | G06F 21/53 726/25 |
| 8,671,451 B1* | 3/2014 | Lambert | ............... | H04W 12/08 380/270 |
| 2006/0029063 A1* | 2/2006 | Rao | ..................... | H04L 12/2856 370/389 |
| 2006/0136570 A1* | 6/2006 | Pandya | ............. | G06F 17/30985 709/217 |
| 2010/0071062 A1* | 3/2010 | Choyi | ................. | H04L 63/1441 726/23 |
| 2011/0302656 A1* | 12/2011 | El-Moussa | .......... | H04L 63/1425 726/24 |
| 2012/0297042 A1* | 11/2012 | Davis | ...................... | H04L 45/60 709/223 |
| 2014/0215141 A1* | 7/2014 | Leon | ................ | H03K 19/17776 711/106 |
| 2015/0262194 A1* | 9/2015 | Dunlop | ................. | G06Q 30/06 705/318 |
| 2016/0205071 A1* | 7/2016 | Cooper | .............. | H04L 12/6418 726/1 |
| 2016/0308886 A1* | 10/2016 | Lee | ..................... | H04L 63/1441 |

* cited by examiner

*Primary Examiner* — Ali Shayanfar
(74) *Attorney, Agent, or Firm* — Berkeley Law & Technology Group, LLP

(57) ABSTRACT

An apparatus, a system, and a method for providing a security barrier between local network and an internet connection.

16 Claims, 2 Drawing Sheets

DEVICE FOR PROVIDING SECURITY BARRIER FOR NETWORK

FIELD

The subject matter disclosed herein relates generally to network security.

BACKGROUND

Connecting a local network to the Internet carries certain security-related concerns. For example, malicious actors may attempt to infiltrate, hack, or cause harm to a network and/or devices residing thereon. Malicious content, such as malware like viruses and worms, may attempt to enter a network and/or harm computing and network devices on the network. In some cases, a network device, such as a router or a modem, may include a rudimentary firewall, but tend to not offer sufficient protection to reasonably secure a local network against external threats. Similarly, in some cases, computing devices on a local network may include some sort of firewall protection in a software layer. However, in some cases, these programs need to be installed on each computing device, tend to be relatively opaque in their operation, and, again, do not offer reasonable protection against external threats.

In addition to concerns related to external threats, an Internet connection also carries certain security- and access-related concerns relative to computing devices on a local network. For example, access to certain websites may be undesirable to avoid, for instance, wasting time, certain types of content (e.g., adult content, etc.), locations that pose known security threats, etc. Some approaches to confronting such concerns include use of filtering software on computing devices, some limited protection on routers and/or modems, etc. However, these approaches tend to have the same or similar drawbacks as those discussed above in relation to external threats.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Figure 1:
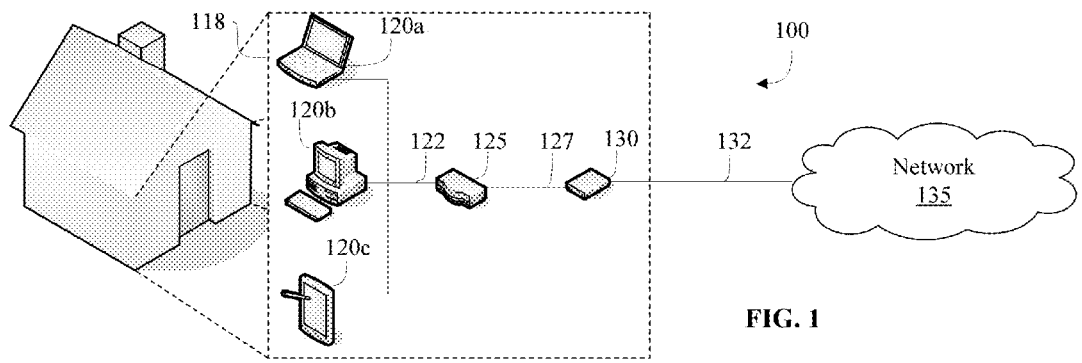
FIG. 1 illustrates a system for accessing a network.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

Securing a local network from malicious content (e.g., computer viruses, worms, adware, etc.), malicious senders, and undesirable content (e.g., content of an illegal, pornographic, etc. nature), among other things, may be desirable. However, while off-the-shelf security solutions including, but not limited to, firewalls and anti-virus functionality may offer some level of protection within the abilities and/or know-how of most Internet users, the ease with which the protections of these solutions may be overcome may, in some cases, be relatively great. In contrast, more robust security offerings tend to also call for relatively significant know-how in order to function properly. For example, in some cases, robust security protection may be set up, managed, and/or run by trained Information Technology (IT) experts.

One approach to addressing the foregoing includes a security device that can use a set of security policies to inspect signal packets being transmitted to the Internet via an Internet connection of a communication network and signal packets being received from the Internet via the Internet connection. Responsive to the inspection thereof, signal packets may be allowed, blocked, filtered, modified, or a combination thereof, where blocking signal packets refers to stopping reception/transmission of signal packets (e.g., rejecting), and filtering refers to stopping reception/transmission of at least one, but less than a totality, of a plurality of signal packets.

Consistent with the foregoing background, the reader's attention is drawn to FIG. 1, which illustrates a system for accessing a network according to one embodiment. In this example embodiment, a small office, home office, or home networking environment 118 is illustrated. By way of simple illustration, environment 118 is shown relative an icon illustrating a home or a small office to illustrate an example context for accessing a wide area network (WAN), such as the Internet, illustrated as network 135. However, this illustration is not necessarily intended to be taken in a limiting sense. An environment, such as environment 118 may comprise a small office/home office (SOHO) environment in one embodiment. In contrast to many communication networks, an enterprise or large business environment may have a sophisticated network with dedicated information technology (IT) personnel to setup, run, maintain, upgrade, etc., the network and/or devices residing and/or operating thereon. Whereas, in non-enterprise network environments, setup, maintenance, upgrades, etc. to the network (and/or computers on the network) are usually performed by persons with minimal understanding of computing devices, networking architecture, and/or the complexities of Internet security.

In one implementation, environment 118 may comprise one or more devices for providing access to content via the Internet. For example, computing devices 120a, 120b, and 120c illustrate sample devices that may be capable of providing access to network 135 (e.g., the Internet). Computing devices 120a, 120b, and 120c are illustrated as a laptop computer, a desktop computer, and a tablet computer, but are not limited to these example implementations. Indeed, any number of potential computing devices capable of accessing content, such as via the Internet, are contemplated by the present disclosure. In environment 118, the local network (comprising networked computing devices 120a-120c, packet routing device 125, and modem 130) may be referred to as a communication network.

An example packet routing device 125, sometimes referred to merely as a router, is illustrated as being electrically connected and/or otherwise coupled via connection 122 to computing devices 120a, 120b, and 120c. Packet routing device 125 refers to a device capable of receiving one or more signal packets, and routing the received one or more signal packets to a desired destination. For example, packet routing device 125 may be capable of receiving one or more signal packets for which one or more of computing devices 120a, 120b, and/or 120c are desired recipients. In one case, destination information may be included in a portion of signal packets. For example, indications of identity, such as, for example, an IP address, a media access control (MAC) address, or other identifier, may be included, at least in part, in a portion of a signal packet (e.g., in a header of a signal packet). Packet routing device 125 may be capable of inspecting received signal packets, and determining an appropriate destination thereof, such as, for example, by reference to an indication of identity included in the signal packet, and transmitting the signal packet to the desired destination.

A device capable of modulating and/or demodulating signals, referred to herein as a modem, may also be found in environment 118. Modem 130 refers to a device capable of receiving one or more signal packets and encoding and/or decoding the received one or more signal packets. For example, in one embodiment, one or more signal packets may be transmitted to environment 118 via a wired or wireless connection, such as via a DSL, cable, or LTE connection, by way of non-limiting example, and modem 130 may be capable of receiving the one or more signal packets and decoding them for transmission, via packet routing device 125, to computing devices 120a, 120b, and/or 120c. Likewise, modem 130 may be capable of receiving one or more signal packets from packet routing device 125, encoding and/or decoding the received one or more signal packets, and transmitting the resulting signals via a connection, such as connection 132, to network 135.

In operation, the one or more devices illustrated in environment 118 may be employed to transmit and/or receive signal packets comprising content and/or to facilitate the transmission and/or reception of signal packets. For example, a user may use a computing device, such as computing device 120a, to access content such as e-mail, webpages, streaming audio and/or video, etc. Computing device 120a may transmit a request for content responsive to a manipulation of an interface of computing device 120a by a user; the request may be transmitted via connection 122 to packet routing device 125. In one implementation, a request may be included in a signal packet, and packet routing device 125 may transmit the signal packet, via connection 127 (which may comprise some form of electronic coupling), to modem 130. In one implementation, modem 130 may encode the signal packet according to a desired protocol, and may transmit it via connection 132, to network 135.

Assuming, by way of illustration, that a request transmitted as a signal packet comprises a URL, one or more signal packets responsive to the request and corresponding to the URL may be transmitted from network 135, via connection 132, to modem 130. The one or more signal packets may be decoded and transmitted via connection 127 to packet routing device 125. Packet routing device 125 may inspect the one or more signal packets and, for example, based on an identifier included therein, transmit the one or more signal packets to an identified computing device (e.g., computing device 120a), to allow display of the requested content.

A connection to a WAN (e.g., an Internet connection), such as network 135, carries certain threats and/or dangers to a communication network or local area network (LAN) and/or devices located on the LAN. For example, but not by limitation, hackers, malware (e.g., viruses and worms), adware, among other things, are possible threats that may lead to physical damage and/or degradation to one or more devices of a LAN, theft of bandwidth, theft of private, personal, and/or confidential information, stolen assets and/or identity, etc.

Hackers may attempt to infiltrate a device and/or network in order to hijack a device, steal information (e.g., user names, passwords, financial information, etc.), and spy on users, among other things.

Viruses and worms may be introduced into a network or a computing device via connection 132 to network 135. As referred to herein, viruses refer to a form of programming instructions that, when executed, facilitates replication of the instructions into other programs, data files, content, memory (e.g., the boot sector of a hard drive), etc. A virus may steal space in a memory of a device, CPU processing time, may access private information, may delete, modify, and/or corrupt data, log keystrokes or other user interactions with an interface, display messages, steal contact information or send undesired messages to contacts, and/or lock up a computing device, among other things. Worms refer to a form of programming instructions that, though programmed to reproduce, do not necessarily attach themselves to other programs, as viruses do. Worms may cause similar damage and/or disruption to a computing device and/or network.

The foregoing is merely intended to illustrate several example threats that may be encountered in a local network environment, such as environment 118. As should be apparent, having a connection to an external network, such as network 135 may leave local devices vulnerable to attacks, among other things.

A firewall is one possible method for reducing external threats to local devices. A firewall refers to a combination of hardware, software, and/or firmware capable of limiting and/or restricting transmission and/or reception of incoming and/or outgoing signal packets via a local network connection to a WAN, such as the Internet. For example, a firewall may be integrated into a modem, a router, and/or even in software running in a computing device. However, in some cases, firewalls may only provide limited protection against external threats. For example, a software-based firewall running on a computing device may be capable of intercepting some potentially malicious signal packets running in the application layer of the OSI model, but may be unable to block signal packets running on the network layer, or vice versa, for instance.

Further, in at least some cases, firewalls may be relatively effective against threats that have been previously identified, but may be less effective against more recent threats that may not have been previously observed and/or added to a database and/or catalog of threats, etc. Additionally, firewalls may be relatively challenging to set up and/or manage. For instance, setting up a firewall may require knowledge as to a variety of network parameters and/or preferences (e.g., configuring a firewall to allow access for streaming media, online games, etc.) in some implementations. Indeed, in at least some cases, the amount of knowledge necessary to configure a firewall may exceed that of a user in a typical network environment. And, once operating, a firewall may require regular attention and/or fine-tuning. For example, a firewall running on a computing device may prompt users to accept or block a transmission, and users may not understand the prompt and/or properly manage the firewall, thus potentially leaving the computing device vulnerable to an attack or a virus, among other things. For at least the foregoing reasons, there may be a desire to provide users within typical communication network environment (e.g., a small or home office network) a more effective and/or accessible approach to security from external threats.

In addition to external threats, a computing device or local network may also be vulnerable internally and/or there may be a desire to control access to the Internet for computing devices on a LAN, such as network environment 118. For example, it is not uncommon for a user of a computing device on a local network to unknowingly open an email containing a form of malware and that subsequently infects one or more other devices of the local network. By way of further example, content of a restricted or undesirable nature may be requested, such as by a computing device on network environment 118, and/or there may be a desire to reduce and/or otherwise restrict access to such content. Such content may include, but not be limited to, content of a pornographic nature, illegal content, content known and/or believed to carry viruses, content of a time-wasting type, etc.

One method of handling internal threats, aside from firewalls, may include Internet filters. In this context, filters refers to software, hardware, firmware, or a combination thereof, that may enable selective blocking and/or modification of signal packets. For example, in some embodiments, filters may compare signal packets against lists of restricted content, content types, URLs, etc., in an effort to block or otherwise restrict access to certain items of content. In some cases, in order to operate as desired, filters may require an up-to-date listing of restricted websites and/or items of content in order to function as desired.

In some cases, filters may have a tendency towards over-filtering content, such as filtering access to content that would normally be considered innocuous, but, in an abundance of caution, may nevertheless be filtered. In contrast, in some cases, content may be under-filtered, such that content of an undesirable type may be allowed to be transmitted to a computing device of a local network (e.g., allowing access to restricted content). Balancing between over- and under-filtering can be a complicated process and may call for a certain amount of know-how on the part of an end-user.

One embodiment of the present disclosure proposes a device with firewall functionality, anti-virus functionality, anti-spam functionality, VPN functionality, content filtering functionality, or any combination thereof, included in a single device and referred to herein as a unified threat management (UTM) device. While some approaches to UTM may be prohibitively expensive, require management and upkeep thereof by professional IT staff, and generally ill-suited for many networking environments, claimed subject matter is different. Claimed subject matter proposes a device that, in some embodiments, may be pre-configured (e.g., configured at the factory or distributor, etc. with a set of security policies), easily-configured (e.g., configured remotely by a machine or a person other than the end user, configured by accessing a simplified graphical user interface, such as an interface hosted by or on the device, etc.), and/or may be inserted into a local network with as little effort or know-how as would be required to insert a residential-grade router into a network. The proposed device may also offer functionality comprising an ability to block, modify, filter, and/or allow passage of signal packets entering a local network from one or more external sources, and/or to block, modify, filter, and/or allow passage of signal packets originating from within the local network and intended for one or more sources external to the local network. Claimed subject matter also contemplates methods and/or procedures for facilitating this functionality.

Figure 2:
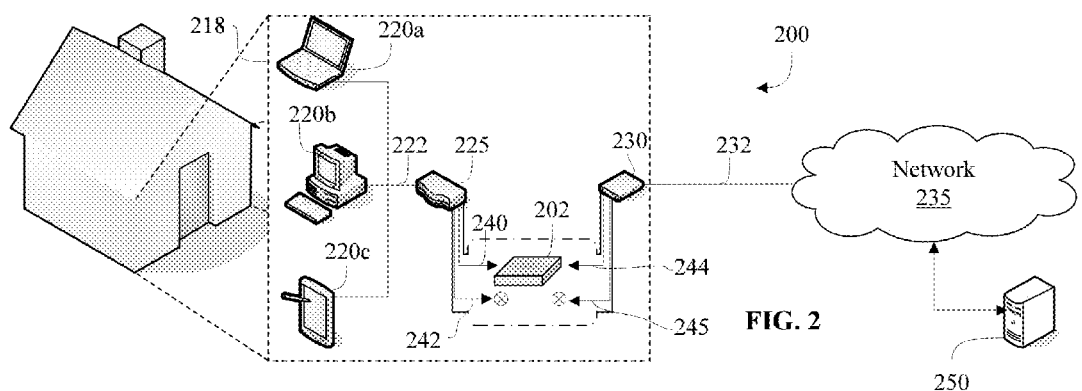
FIG. 2 illustrates a system for accessing a network using a security device according to one embodiment.

FIG. 2 illustrates an embodiment of a system 200. In one embodiment, an illustrative network environment 218 may comprise a plurality of computing devices (220a-220c) on a local network. Computing devices 220a-220c may be electrically connected and/or coupled via a connection 222 to packet routing device 225. Modem 230 may be connected to an external network 235 (e.g., WAN) via connection 232. In one embodiment, security device 202 may be connected and/or coupled between modem 230 and packet routing device 225. To illustrate a capability of security device 202 to block, modify, and/or filter signal packets, security device 202 is illustrated in a box with broken lines and two sets of arrows from packet routing device 225 and modem 230, respectively. As illustrated, packets transmitted along 240 are inspected and determined eligible, such as by a UTM component, to be transferred to network 235. In contrast, signal packets transmitted along 242 are determined to violate one or more guidelines or considerations (e.g., security policies), and as such, are blocked (represented by the ⊗ symbol). Similarly, signal packets received by security device 202 from modem 230 may be allowed (see 244) or blocked (see 245) based, at least in part, on whether or not the signal packets meet or violate one or more guidelines or considerations (e.g., security policies).

In one embodiment, an attempt may be made via a computing device (e.g., computing device 220a) to access a website, address, or combination thereof, for which access has been blocked or is otherwise unauthorized. For example, a website may be on a list (e.g., within a lookup table) of blocked websites, security device 202 may determine that access to a desired website is not authorized, and security device 202 may block, modify, or filter signal packets comprised within a request. The website in question may be included in a lookup table that was pre-configured when security device 202 was manufactured and/or shipped, in one embodiment. In another case, security device 202 may be configured via a user interface (e.g., a web browser-based GUI) and one or more websites may be indicated as being undesirable (e.g., pornographic, time-wasting, malicious, etc.). Additionally, in one implementation, certain websites, addresses, or combinations thereof, may have their access restricted at certain times (e.g., restricting access to certain websites during work hours, after hours, on holidays, etc.)

Similarly, one or more signal packets may be received by security device 202 from modem 230. The one or more signal packets may be inspected and, in one case, it may be determined that the signal packets do not meet one or more criteria or policies. For instance, security device 202 may detect that the one or more signal packets comprise potentially malicious content (e.g., an item of content meeting one or more conditions indicating potential to disrupt operation of a computing device, gather sensitive information, gain access to private computing devices, cause harm to a computing device, etc.), come from a potentially malicious source (e.g., one or more indications within a signal packet suggesting that the signal packet originated from a source identified as malicious by security policies, etc.), exhibit suspicious behavior and/or were transmitted/received in suspicious circumstances, etc. The one or more signal packets may be received and/or inspected, for instance, by a UTM component of security device 202, such as UTM 412 in FIG. 4, and they may be blocked, modified, or filtered, consistent with the criteria and/or guidelines (e.g., security policies) specified for operation of security device 202.

Server 250 in FIG. 2 represents a remote or cloud server that may be capable of transmitting and/or receiving signals and/or states related to one or more security policies of security device 202. For example, the transmitted and/or received signals and/or states may provide updates to, additions to, and/or removals from security policies of a security device. By way of example, server 250 may be capable of providing updates to virus definitions or new virus definitions to assist security device 202 in identifying potentially malicious content. In one case, server 250 may be capable of providing and/or updating a list of websites, URLs, addresses, etc. to which access may be restricted or blocked. In one implementation, such access may part of a set of security policies, which may be set by an end-user, among other things.

Figure 3:
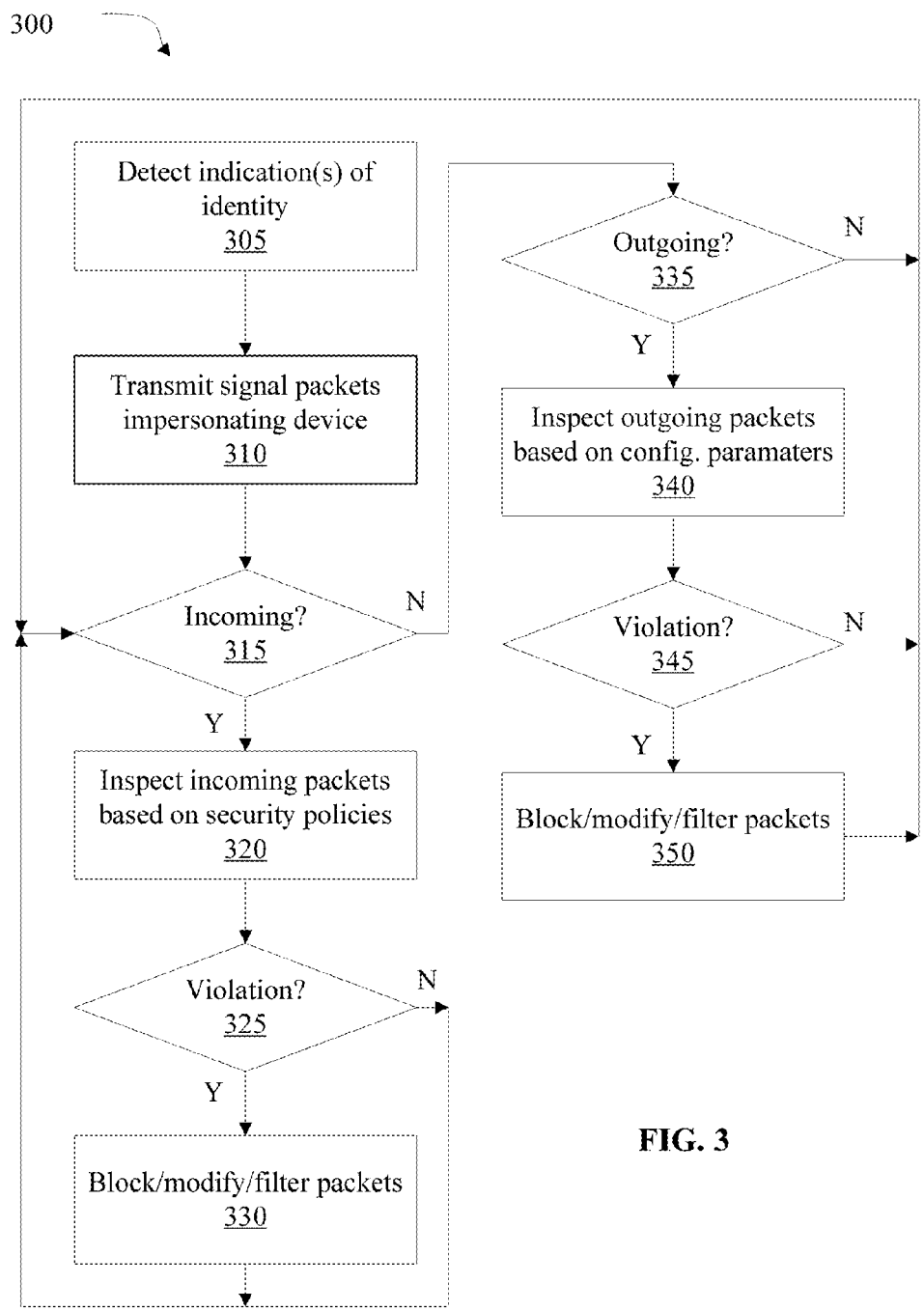
FIG. 3 illustrates a method for securing a network according to one embodiment.

FIG. 3 is a flow diagram illustrating a method 300 according to one embodiment, and is presented to illustrate possible operation of a security device, such as security device 202. As such, it is not to be understood in a limiting sense.

At block 305, a security device detects an indication of identity of one or more computing devices. For example, referring to FIG. 2, one of computing device 220a-220c may comprise one or more indications of identity including, but not limited to, an IP address, a MAC address, a machine name, a network name, etc. Furthermore, packet routing device 225 and/or modem 230 may also comprise one or more indications of identity. The detected indications of identity may be stored in a storage medium, such as memory 406, shown in FIG. 4.

At block 310, one or more signal packets may be transmitted from the security device emulating a device from which the one or more signal packets were received (e.g., from a client device). For example, if one or more signal packets are received from a computing device on a local network (e.g., computing device 220a in FIG. 2), the security device may use captured indications of identity (e.g., MAC address and/or IP address) of the computing device to transmit the one or more signal packets, via modem 230, to network 235. For instance, if the security device has a MAC address and a client device (e.g., computing device 220a in FIG. 2) has a different MAC address, the security device may use the MAC address of the client device to access the Internet, such as via modem 230. Thus, if modem 230 transmits and/or receives signal packets from the security device using the MAC address of a client device, modem 230 may not determine that it is exchanging signal packets with a security device, rather than the client device. In this way, it may be possible for security device 202 to remain transparent on the network. Among other things, it may be advantageous for a presence of the security device to be difficult, if not impossible, to be detected. Indeed, by emulating other devices, it may be possible to provide, among other things, heighted protection against malicious attacks.

Additionally, in some cases, it may be desirable for a security device to emulate other devices, such as modem 230 in FIG. 2, within a local network so that computing devices may not be able to detect a presence of the security device on the local network. It may be desirable, for instance, to emulate a packet routing device or modem, because, among other things, it may make it more difficult for computing devices on a local network to bypass security policies, configuration parameters, etc.

At block 315, a determination may be made at a security device as to whether or not incoming signal packets are detected. In this context, incoming signal packets may refer to signal packets entering a local network from an external source, such as via a modem (e.g., modem 230). However, this is merely an arbitrary determination made here to facilitate discussion, and is not intended to be taken in a limiting sense.

If no incoming signal packets are detected, then method 300 may advance to block 335. However, if incoming signal packets are detected, then method 300 may advance to block 320.

At block 320, received incoming signal packets are inspected consistent with security policies of a security device. In one embodiment, inspection of signal packets may be performed by a UTM component, such as UTM 412 in FIG. 4. Inspection of signal packets based, at least in part, on security policies may facilitate identification of potentially malicious senders, suspicious behavior (e.g., signal packets that have traversed suspicious IP addresses, etc.), potentially malicious content, etc. In one implementation, received signal packets may be compared against security policies in order to determine whether a violation or potential violation has occurred.

If it is determined that one or more signal packets do not violate security policies, then method 300 may return to block 315. Otherwise, method 300 may advance to block 330. There are a number of ways in which it may be determined that a policy has been violated. For instance, in one embodiment, signal packets may be assigned a risk score based on a comparison with security policies, and based, at least in part, on the risk score, a determination may be made of whether security policies would be violated by transmission of the signal packet. In one implementation, one or more portions of a security policy may such that any violation thereof may contribute to a determination that the security policies have been violated. For instance, in one case, a set of security policies may indicate one or more addresses from which signal packets are not to be accepted under any circumstances. As such, even if signal packets appear to be innocuous, if they appear to be from one or more addresses from which signal packets are not to be accepted, the signal packets may be deemed a violation of security policies, and the signal packets may be handled consistently with security policy guidelines (e.g., modify, block, filter, etc.).

Figure 4:
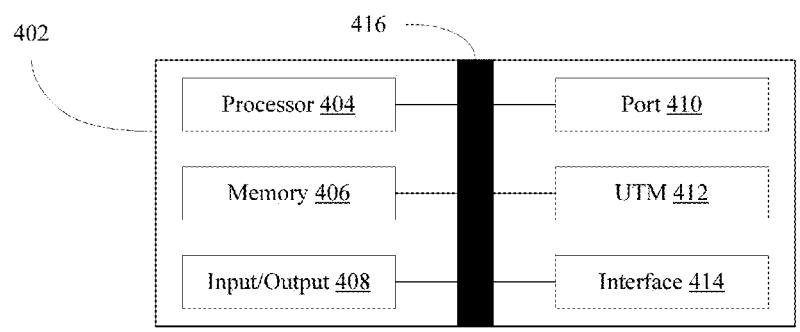
FIG. 4 is a block diagram illustrating a security device according to one embodiment.

If it is determined that there is a violation of one or more security policies, then a UTM component, such as UTM 412 in FIG. 4, may block, filter, or modify signal packets consistent with security policies. For example, in some cases, certain security policy violations may be such that blocking of signal packets in violation of policy is performed without user input. For instance, signal packets sent from a known malicious address may be blocked without user input. In some cases, some signal packets carrying potentially malicious signals and/or states may be modified by a UTM component, such as UTM 412 in FIG. 4, in order to remove potentially malicious signals and/or states, etc. In some cases, a plurality of signal packets may be received and, based on security policies of a UTM component, one or more of the plurality of signal packets may be filtered out.

In one embodiment, after signal packets that violate security policies have been blocked, modified, or filtered, method 300 may return to block 315.

In one embodiment, detection of incoming and outgoing signal packets may occur concurrently or substantially concurrently. However, to simplify the discussion, in FIG. 3, detection of incoming and outgoing signal packets are illustrated as occurring in series, without limitation. At block 335, a determination is made as to whether any outgoing signal packets are detected. In this context, outgoing signal packets refer to signal packets received from one or more computing devices on a local network and/or intended for an external recipient. It is noted, however, that the designations "incoming" and "outgoing" is arbitrary and used here merely for clarity in in distinguishing between signal packets.

If no outgoing signal packets are detected, then method 300 may advance to block 315. Alternatively, if outgoing signal packets are detected, then method 300 may advance to block 340 for inspection.

At block 340, signal packets are to be inspected based, at least in part, on security policies. In one embodiment, a UTM component of a security device, such as UTM 412 in FIG. 4, may inspect detected outgoing signal packets. Signal packets may be compared with one or more security policies. For instance, an intended recipient (e.g., an IP address or URL) for one or more detected outgoing signal packets may be identified, and a determination may subsequently be made as to whether transmission of the one or more detected outgoing signal packet comprises a violation of one or more security policies (e.g., whether the recipient IP address or URL is authorized or not). It might be, for instance, that a certain website is included in a list of unauthorized websites, and it may be determined that one or more outgoing signal packets are directed to this unauthorized website. In such a case, it might be subsequently determined that transmission of signal packet to the unauthorized website would be a violation of one or more security policies (see block 345).

In another case, it may be determined that one or more signal packets appear to bear a signature of a virus infection (e.g., potentially indicating that a computing device from which the one or more signal packets originated has been infected by a virus). In such cases, a UTM may determine that the one or more signal packets violate security policies (see block 345).

The foregoing examples are provided to illustrate different embodiments consistent with claimed subject matter. The examples are not intended to limit claim scope to only those embodiments.

At block 345, a UTM component, such as UTM 412 in FIG. 4, may be capable of determining whether or not a violation of security policies has occurred. Assuming no violation, then method 300 may return to block 315. Otherwise, appropriate blocking, modifying, and/or filtering may occur, such as by a UTM component (see block 350). Similar to as discussed above, inspection of signal packets may yield a risk score, and a determination of whether or not a signal packet violates security policies may be based on a determination of whether or not the risk score exceeds a threshold. For example, one or more metrics may be determined for a plurality of different comparisons, and a risk score may be assigned based at least partly on how signal packets compare to metrics. The resulting risk scores may be aggregated to yield a total risk score, and the total risk score may be compared against a threshold.

Alternatively, one or more factors may be determined to independently indicate and/or suggest a violation of one or more security policies. For example, in one implementation, if a signal packet is received having a destination that is determined to be unauthorized, a UTM component may automatically, or without user input, block the signal packet. In some cases, it may be desirable for a message to be transmitted back to the computing device to inform that a signal packet has been blocked. For example, a webpage may be displayed on the computing device informing users of a rationale for determining that a violation had occurred (e.g., access to a restricted site had been requested), among other things.

At block 350, a UTM component, such as UTM 412, may block, modify, and/or filter signal packets determined to violate security policies. Similar to the above discussion of block 330, one or more signal packets may be determined to violate one or more security policies. As such, a UTM component may block, modify, and/or filter the one or more signal packets. For example, in some cases it may be determined, for instance, based at least partly on one or more security policies, that one or more signal packets are to be blocked. In some cases, after blocking signal packets, a message may be transmitted to a computing device that transmitted unauthorized signal packets informing the device of the violation and/or relevant security policies.

In one embodiment, method 300 may loop and/or otherwise run continuously or semi-continuously (e.g., while a security device is turned on), by way of example.

FIG. 4 illustrates a security device 402 according to one embodiment. Security device 402 may comprise one or more processors, referred to as processor 404, one or more memories, referred to as memory 406, an input/output component, referred to as input/output 408, one or more ports, referred to as port 410, a UTM component, referred to as UTM 412, an interface component, referred to as interface 414, or any combination thereof. Of course, any number of additional components or modules may also be present in a security device 402, consistent with the present disclosure. Processor 404, memory 406, input/output 408, port 410, UTM 412, and interface 414 may be electrically coupled, such as via bus 416. Consequently, in one implementation, signals and/or states may be transmitted and/or received between components of a security device, such as via bus 416.

Processor 404 refers to a combination of hardware, software, and/or firmware (but not software per se) for executing instructions, such as instructions stored in memory 406. In one embodiment, processor 404 may comprise digital circuits to perform at least a portion of a computing procedure and/or process. By way of example, but not limitation, processor 404 may comprise one or more processors, such as controllers, microprocessors, microcontrollers, application specific integrated circuits (ASICs), digital signal processors, programmable logic devices, field programmable gate arrays (FPGAs), the like, or any combination thereof. In implementations, processor 404 may perform signal processing to manipulate signals and/or states, to construct signals and/or states, etc., for example. In one embodiment, one or more instructions may be executed by processor 404 in order to enable functionality including, but not limited to, that discussed above in relation to FIGS. 2 and 3 including inspecting, blocking, filtering, modifying, and transmitting signal packets, such as described above. Use of terms such as "processing," "computing," "calculating," "determining," "establishing," "obtaining," "identifying," "selecting," "generating," "detecting," "transmitting," "inspecting," "emulating," and/or the like may be used in the specification, such as in relation to processes and/or functionality, and may be accomplished using one or more processors, such as processor 404.

Memory 406 refers to a non-transitory storage medium, and is not necessarily representative of a given storage mechanism. Memory 406 may comprise, for example, primary memory and secondary memory. Further, memory 406 may comprise additional memory circuits, mechanisms, or combinations thereof. Memory 406 may comprise, for example, random access memory (RAM), read only memory (ROM), etc., such as in the form of one or more storage devices and/or systems, such as, for example, a disk drive, an optical disc drive, a tape drive, a solid-state memory drive, etc., just to name a few examples. Memory 406 may be utilized to store a program, a routine, or other form of instructions. Memory 406 may also comprise a memory controller for accessing a computer readable-medium that may carry and/or make accessible content, which may include code, and/or instructions, for example, executable by processor 404 and/or some other unit, such as a controller and/or processor, capable of executing instructions, for example.

Under direction of processor 404, memory, such as memory cells storing physical states, representing, for example, a program, may be executed by processor 404 and signal packets may be inspected, blocked, filtered, modified, transmitted, etc., via UTM 412, for example.

Input/output 408 refers to a combination of hardware, software, and/or firmware components (but not software per se) for communication of signals, states, and/or computing values between one or more devices and/or peripherals. For instance, in one embodiment, an input/output component, such as input/output 408, may facilitate communication of signals, states, and/or computing values between security device 402 and a peripheral, such as a monitor, keyboard, mouse, printer, etc.

Port 410 refers to one or more hardware connections to allow connection and/or coupling of one or more devices. For example, security device 402 may comprise a universal serial bus (USB) port, and signal packets may be transmitted via the USB port. Port 410 may also comprise a port to facilitate transmission and/or reception of signal packets between or among devices in an environment (e.g., environment 118 in FIG. 1) or a network, and/or to an external network, such as network 135 in FIG. 1. Any number of physical ports, including, but not limited to, the foregoing examples are contemplated by the present disclosure. Additionally, while ports presently used are contemplated, ports yet to be developed are also contemplated by port 410. In one example, signal packets received from an external source, such as via network 135 in FIG. 1, may be received at security device 402 via port 410. Similarly, signal packets to be transmitted to an external source, such as via network 135 in FIG. 1, may be transmitted via port 410. Also, signal packets received and/or transmitted from devices on a LAN, may also be received and/or transmitted via port 410.

UTM 412 refers to a combination of hardware, software, and/or firmware (but not software per se) capable of inspecting, blocking, filtering, modifying, passing through, etc., signal packets. For example, in one implementation, UTM 412 may facilitate firewall functionality, which may act to block, modify, and/or filter one or more signal packets received at UTM 412, such as from an external source (although firewall functionality may also be used to inspect, modify, block, and/or filter signal packets from an internal source). In one case, UTM 412 may facilitate filtering functionality, which may act to block, modify, and/or filter one or more signal packets received at UTM 412, such as from an internal source (although filtering functionality may also be used to inspect, modify, block, and/or filter signal packets from an external source).

In one embodiment, UTM 412 may be capable of receiving one or more signal packets, such as via input/output 408. In one case, the received signal packets may be received from outside a communication network, such as the network illustrated in environment 118. UTM 412 may be capable of inspecting the received signal packets. As referred to herein, packet inspection refers to inspecting a header portion of a packet, a content or body portion of a signal packet (e.g., a portion containing signals and/or states representing, among other things, content), or a combination thereof, and comparing the results with a set of considerations or guidelines. In one embodiment, considerations or guidelines for use in inspecting signal packets may be referred to as security policies. By way of example but not limitation, UTM 412 may inspect signal packets based on security policies that take into consideration source and/or destination addresses of signal packets, protocol used to transmit signal packets, TCP and/or UDP traffic, port number to which signal packets are addressed, connection state criteria, etc. By way of simple illustrative example of security policies, one or more security policies may restrict access to and/or from one or more source and/or destination addresses, and to the extent that one or more signal packets may be detected as comprising one of the restricted addresses, UTM 412 may modify, filter, and/or block transmission and/or reception thereof.

In one embodiment, packet inspection may occur on any one or more of the OSI layers. In response to the inspection, packets may be blocked (e.g., dropped or discarded), modified (e.g., altered to remove potentially malicious contents), filtered (e.g., allowing some portions to be transmitted while blocking others), etc.

Similarly, inspection of packets may occur as to signal packets received from one or more computing devices on a local network. By way of non-limiting example, a signal packet may be received from a computing device (e.g., computing device 120a in FIG. 1). UTM 412 may inspect a signal packet and determine that, for example, it does not meet the guidelines or considerations established for transmission. For example, in one case, it may be determined that a destination address corresponds to an address to which access by the computing device (e.g., computing device 120*a*) is not authorized. Once determined, UTM 412 may be capable of blocking the signal packet. In some cases, it may be desirable to respond to computing device 120*a* with one or more signal packets indicating that a transmitted signal packet was blocked and providing a reason therefor. In one alternative embodiment, a computing device, such as computing device 120*a*, may be redirected to a different website after determination of a restricted address and/or restricted content.

In another example, in inspecting a signal packet, UTM 412 may detect that the signal packet transmitted by a computing device may have been transmitted by a portion of the computing device infected with a virus or other malware. Again, the signal packet may be blocked, filtered, modified, etc., and, in some cases, a notification transmitted and/or a computing device redirected. As such, in one implementation, inspection of signal packets may be based at least in part on one or more security policies that may comprise restricting access to one or more addresses, URLs or websites, detecting behavior indicative of potential virus infection to a computing device within a network, limiting or restricting access to internal and/or external network resources at different times of the day, week, month, or year, etc., and detecting and restricting transmission of content determined to be undesirable within the security policies (e.g., illegal, gambling-related, terrorist-related, etc.), among other things.

Interface 414 refers to a component for facilitating an interface with a user. In one embodiment, interface 414 may enable display of one or more indicators so as to be understood by users. For example, interface 414 may facilitate illumination of one or more indicators, lights, and/or LEDs to indicate, for example, operation of security device 402, transmission and/or reception of signal packets, and UTM function, among other things. Interface 414 may work in concert with processor 404 and/or memory 406 to enable transmission of indicators to users and/or reception of interactions from users.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

One skilled in the art will recognize that a virtually unlimited number of variations to the above descriptions are possible, and that the examples and the accompanying figures are merely to illustrate one or more particular implementations for illustrative purposes. They are not therefore intended to be understood restrictively.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus for providing a security barrier between a communication network and an internet connection, the apparatus comprising:

a transceiver device; and
one or more processors comprising a digital circuit configured to perform at least a portion of a computing procedure to:
  detect one or more indications of identity of one or more devices of the communication network;
  obtain a first set of signal packets, received at the transceiver device, from at least one of the one or more devices of the communication network;
  inspect the first set of signal packets based, at least in part, on a set of security policies comprising blocking, filtering or modifying, or a combination thereof, the first set of signal packets comprising potentially malicious content, the first set of signal packets originating from a potentially malicious source, the first set of signal packets exhibiting suspicious behavior, the first set of signal packets transmitted, received under suspicious circumstances, or a combination thereof;
  responsive to the inspection of the first set of signal packets block, filter or modify, or a combination thereof, at least one of the first set of signal packets based, at least in part, on the set of security policies to form a modified first set of signal packets;
  responsive to formation of the modified first set of signal packets, initiate transmission of the modified first set of signal packets via the transceiver device, the transmission of the modified first set of signal packets comprising emulating the at least one of the one or more devices based, at least in part, on the one or more indications of identity;
  inspect a second set of signal packets received from the internet connection via the transceiver device and intended for the at least one of the one or more devices, the inspection of the second set of signal packets based, at least in part, on the set of security policies; and
  responsive to the inspection of the second set of signal packets, block, filter or modify, or a combination thereof, at least one of the second set of signal packets based, at least in part, on the set of security policies to form a modified second set of signal packets for transmission to the at least one of the one or more devices, wherein inspection of the first and second sets of signal packets is performed by a unified threat management (UTM) component of the apparatus, and wherein the UTM component is preconfigured with the set of security policies.

2. The apparatus of claim 1, wherein the one or more indications of identity comprise a media access control (MAC) address, and wherein emulating the at least one of the one or more devices of the communication network is based, at least in part, on the MAC address.

3. The apparatus of claim 1, wherein the one or more processors are further configured to identify a potentially malicious content or a potentially malicious sender, or a combination thereof, responsive to inspection of the second set of signal packets.

4. The apparatus of claim 1, wherein the one or more processors are further configured to identify an unauthorized recipient responsive to inspection of the first set of signal packets.

5. The apparatus of claim 1, wherein the set of security policies is maintained by a cloud-based service.

6. A system for providing a security barrier between a communication network and an internet connection, the system comprising:
  means, comprising a transceiver device, for receiving a first set of signal packets from at least one of the one or more devices of the communication network;
  means, comprising one or more processors including a digital circuit configured to perform at least a portion of a computing procedure, for:
    detecting one or more indications of identity of one or more devices of the communication network;
    inspecting the first set of signal packets based, at least in part, on a set of security policies comprising blocking, filtering or modifying, or a combination thereof, the first set of signal packets comprising potentially malicious content, the first set of signal packets originating from a potentially malicious source, the first set of signal packets exhibiting suspicious behavior or the first set of signal packets transmitted, received under suspicious circumstances, or a combination thereof;
    in response to the inspection of the first set of signal packets blocking, based at least in part, on the set of security policies the first set of signal packets, filtering or modifying, or a combination thereof, at least one of the first set of signal packets based, at least in part, on the set of security policies, to form a modified first set of signal packets;
    transmitting the modified first set of signal packets in response to formation of the modified first set of signal packets, the transmission of the modified first set of signal packets comprising emulating the at least one of the one or more devices based, at least in part, on the one or more indications of identity;
    inspecting a second set of signal packets received from the internet connection and intended for the at least one of the one or more devices based, at least in part, on a set of security policies; and
    in response to the inspection of the second of signal packets sent via the internet connection and based, at least in part, on the set of security policies blocking the second set of signal packets, based at least in part, on the set of security policies the second set of signal packets, filtering or modifying, or a combination thereof, one or more of the second set of signal packets to form a modified second set of signal packets for transmission to the at least one of the one or more devices, wherein inspection of the first and second sets of signal packets is performed by a unified threat management (UTM) component of the apparatus, and wherein the UTM component is preconfigured with the set of security policies.

7. The system of claim 6, wherein the one or more indications of identity comprise a media access control (MAC) address and wherein emulating the at least one of the one or more devices of the communication network uses, at least in part, the MAC address.

8. The system of claim 6, wherein the one or more processors are further configured for identifying a potentially malicious content or a potentially malicious sender, or a combination thereof responsive to inspection of the second set of signal packets.

9. The system of claim 6, wherein the one or more processors are further configured for identifying an unauthorized recipient responsive to inspection of the first set of signal packets received from the at least one of the one or more devices.

10. The system of claim 6, wherein the set of security policies is maintained by a remote cloud-based means.

11. A method for providing a security barrier between a communication network and an internet connection, the method comprising:

- detecting, at one or more processors of a security device, one or more indications of identity of one or more devices of the communication network;
- receiving, via a transceiver of the security device, a first set of signal packets from at least one of the one or more devices of the communication network;
- inspecting, at the one or more processors, the first set of signal packets based, at least in part, on a set of security policies comprising blocking, filtering or modifying, or a combination thereof, the first set of signal packets comprising potentially malicious content, the first set of signal packets originating from a potentially malicious source, the first set of signal packets exhibiting suspicious behavior or the first set of signal packets transmitted or received under suspicious circumstances, or a combination thereof;
- responsive to the inspection of the first set of signal packets, blocking, filtering or modifying, or a combination thereof, at least one of the first set of signal packets based, at least in part, on the set of security policies to form a modified first set of signal packets;
- responsive to formation of the modified first set of signal packets, initiate transmission of the modified first set of signal packets via the transceiver, the transmission of the modified first set of signal packets comprising emulating the at least one of the one or more devices based, at least in part, on the one or more indications of identity;
- inspecting, at the one or more processors, a second set of signal packets received from the internet connection and intended for the at least one of the one or more devices, the inspection of the second set of signal packets being based, at least in part, on the set of security policies; and
- responsive to the inspection of the second set of signal packets, blocking filtering or modifying, or a combination thereof, at least one of the second set of signal packets based, at least in part, on the set of security policies to form a modified second set of signal packets for transmission to the at least one of the one or more devices, wherein inspection of the first and second sets of signal packets is performed by a unified threat management (UTM) component of the apparatus, and wherein the UTM component is pre-configured with the set of security policies.

12. The method of claim 11, wherein the one or more indications of identity comprise a media access control (MAC) address and emulating the at least one of the one or more devices of the communication network is based, at least in part, on the MAC address.

13. The method of claim 11, further comprising identifying potentially malicious content or a potentially malicious sender, or a combination thereof responsive to inspection of the second set of signal packets.

14. The method of claim 11, further comprising identifying an unauthorized recipient responsive to inspection of the first set of signal packets.

15. The method of claim 11, wherein the set of security policies is maintained by a cloud-based service.

16. The method of claim 11, wherein filtering, modifying, blocking, or a combination thereof, of at least one signal packet of the first or second sets of signal packets is performed based, at least in part, on a risk score.

* * * * *